CATHODE RAY TUBE SPOT WOBBLE CIRCUIT

Filed Feb. 20, 1953

INVENTOR.
MICHAEL T. PAPPAS
GEORGE W. KING
BY
H. A. Mashey
ATTORNEY

United States Patent Office 2,722,627

Patented Nov. 1, 1955

2,722,627

CATHODE RAY TUBE SPOT WOBBLE CIRCUIT

Michael T. Pappas, Ardsley, and George W. King, Pleasantville, N. Y., assignors to General Precision Laboratory Incorporated, a corporation of New York Application February 20, 1953, Serial No. 338,054

3 Claims. (Cl. 315—25)

This invention relates to spot wobble circuits for use in conjunction with cathode ray tubes. The invention is especially applicable to television picture tubes for the reduction and elimination of crawl and motion pairing effects.

The term "crawl" is applied to one type of apparent defect in a television picture and refers to apparent motion upward or downward of the texture of the picture. By picture texture is meant the appearance of the individual horizontal lines composing the picture. Although authorities are not agreed as to the exact meaning and cause of the phenomenon of crawl, they agree that it is dependent upon the visibility of the horizontal lines. Crawl is annoying to the observer because it mars the picture, its motion distracts the attention, and it tends to destroy the illusion of realism.

By the term "motion pairing" is meant apparent line pairing due to motion of the observer's eyes caused either by conscious motion of the eyes sweeping the picture vertically, or by unconscious motion of the eyes in following vertical motion in the picture. Line pairing in general is seen as a coarsening of the horizontal line picture texture, and brings the picture structure momentarily to the attention of the observer in a sharp and unpleasant manner, even though it is a transient effect.

Both pairing and crawl, although subjective effects, depend upon the physical and visible existence of the picture line texture, and it has been found that these effects can be minimized by reducing the visibility of the line texture. It has also been found that the best way to reduce line visibility is by wobbling or oscillating the cathode ray vertically while it is scanning horizontally. Then each horizontal line of the picture is not only widened, but if the oscillations are sinusoidal each widened line is made heavier at its upper and lower edges. Both of these effects, when maximized, cooperate to eliminate crawl almost completely.

Additional advantages of this invention are that if interlace be lost or reduced as sometimes happens, causing doubly spaced or paired lines, the resulting coarse line structure is minimized in appearance, and the roughened appearance caused by horizontal motion, termed break-up, is minimized.

The instant invention provides a circuit for oscillating or wobbling the electron beam of the picture tube to superimpose such oscillation on all parts of all horizontal lines of the raster, thus eliminating crawl. In so-doing, the oscillatory motion effectively broadens each picture line so that the dark spaces between lines are substantially eliminated and the usual horizontal line pattern visible on close inspection practically disappears. However, since at proper adjustment no horizontal line is broadened enough to overlap adjacent horizontal lines, no vertical definition is lost. Obviously, when the horizontal line pattern or texture is eliminated, the optical phenomena dependent upon the apparent motion or change of this texture are also necessarily eliminated.

The circuits of this invention include an oscillatory circuit having a relatively high frequency, together with circuit components for the application of the high frequency output to the cathode ray to superimpose a wobble or oscillation upon all of the horizontal lines of the picture.

A purpose of this invention is to eliminate crawl and motion pairing in a video picture by superimposing a high frequency oscillatory motion upon all of the horizontally scanned lines of the picture.

Another purpose of this invention is to provide a high frequency oscillator connected to a video picture tube for applying the oscillations thereof to the electron beam.

A further understanding of this invention may be secured by reference to the following detailed description taken together with the accompanying drawings, in which.

Figures 1, 2, 3, 4:
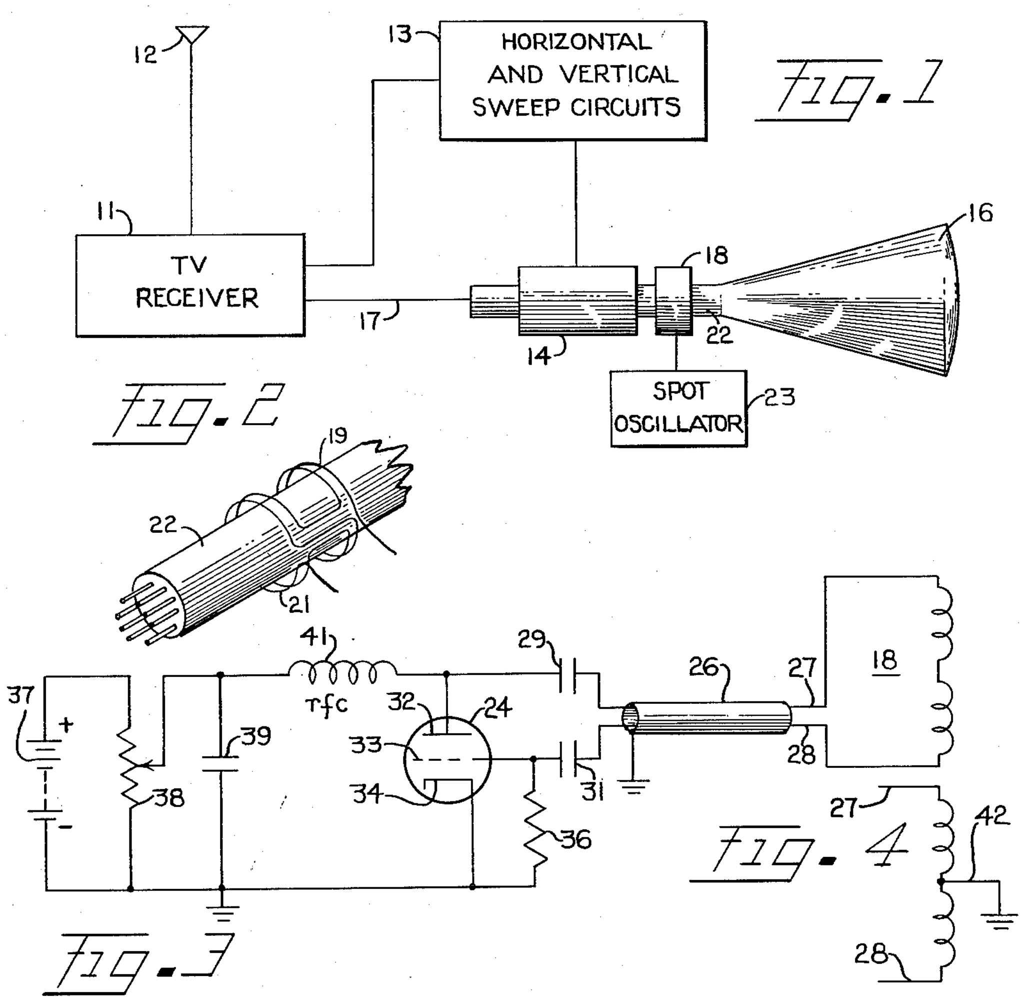
Figure 1 is a block diagram showing one application of the invention.
Figure 2 illustrates a wobble yoke coil used in connection with the invention.
Figures 3, 4 and 5 are schematic diagrams of oscillatory circuits used in connection with the invention.

Referring now to Fig. 1, a television receiver 11 of any type is connected to an antenna 12 for the reception of television signals. The synchronization signals are separated in the conventional manner and applied to horizontal and vertical sweep circuits 13 which through yoke coils 14 deflect the beam of a cathode ray tube 16. The isolated video signal is applied from the television receiver 11 through conductor 17 to an intensifying electrode of the cathode ray tube 16. This is the conventional arrangement for the production of a television picture on the luminous screen of a picture tube 16.

A spot wobble yoke 18 entirely separate from the deflection yoke 14 is applied to the neck of cathode ray tube 16. This yoke 18 is preferably small, composed of but few turns of wire and positioned close to the neck of the tube 16. For example, the spot wobble yoke may consist of two separate coils 19 and 21, Fig. 2, each coil consisting of but two turns of wire. These coils are formed in semicylindrical shapes around the neck 22 in the manner usual for yoke coils, and connected in series aiding relationship. They preferably are placed beneath the yoke 14 so as to occupy the space between the yoke 14 and the neck of tube 16, although in Fig. 1 the two yokes are drawn side by side in an optional position for clarity. The spot wobble yoke 18 is oriented relative to the deflection yoke 14 so that the oscillations produced in the electron beam by the spot wobble yoke 18 are at right angles to the horizontal lines scanned by the horizontal deflection coils of the deflection yoke 14.

The yoke 18 is connected to an electronic oscillator 23 and forms part of the oscillatory circuit thereof. This oscillatory circuit is depicted in detail in Fig. 3 as consisting of the yoke 18 connected to a triode oscillator 24 by means of a short length of dual conductor shielded cable 26, which also forms part of the oscillatory circuit. By this means the losses of power in coupling, in the load formed by the spot wobble yoke, and in the transmission line are all eliminated or greatly reduced. As a practical matter it has been found to be highly desirable to incorporate the yoke and cable as components of the oscillatory circuit to secure reliable operation. The two terminating conductors 27 and 28 of the yoke 18 are connected through the two conductors of cable 26 to a large coupling condenser 29 and a small coupling condenser 31, from which short connections are made to the anode 32 and grid 33 respectively of the triode 24, the cathode 34 of which is grounded. The grid 33 is connected to ground through resistor 36. The time constant of the condenser 31 and resistor 36 must be short, otherwise the triode may block and produce "motorboating." For example, the condenser 31 may have a value of 100 $\mu\mu f.$ and the resistor 36 may have a value of 13,000 ohms. The anode 32 is energized from a source of positive direct voltage 37 through a voltage divider 38 by which the anode voltage and the power output of the circuit may be controlled. A filter comprising condenser 39 and choke 41 are interposed between tube 24 and batter 37 to keep the oscillations produced from entering the battery.

The oscillatory circuit consists of the lumped inductance of yoke 18 together with the distributed inductance of its leads and of the shielded cable, and the capacitance between conductors of the shielded cable and the distributed capacitance of other elements. The frequency of oscillation of the circuit may be controlled in design by controlling the length of cable 26.

It is desirable to set a high enough lower limit on the frequency of the oscillatory circuit so that the wobble or oscillations superimposed on the horizontal lines of the picture will be substantially invisible. As a rough guide, if the frequency be 10 mc./s. the distance between axis-crossing points of the oscillation will be a little less than the distance between adjacent picture lines, and preferably the oscillatory line structure should not be coarser than this.

Interference with television radio frequency reception or the increasing difficulty of designing oscillatory circuits at increasing frequencies may set an upper limit to the oscillatory frequency employed. However, with proper shielding trouble will not be experienced with the use of oscillatory circuits having frequencies between 10 and 20 mc./s., and an oscillatory frequency lying between these limits is preferred. However, frequencies above and below this band can obviously be used to eliminate crawl and break-up in accordance with the basic principle of this invention.

It may be desirable to ground the middle or one end of yoke 18, depending upon the exact conditions of placement of the yoke 18 and its relation to the deflecting yoke 14. For example, a yoke having a grounded midtap 42 and leads 27 and 28 is shown in Fig. 4 for use in the circuit of Fig. 3 in place of yoke 18.

Figure 5:
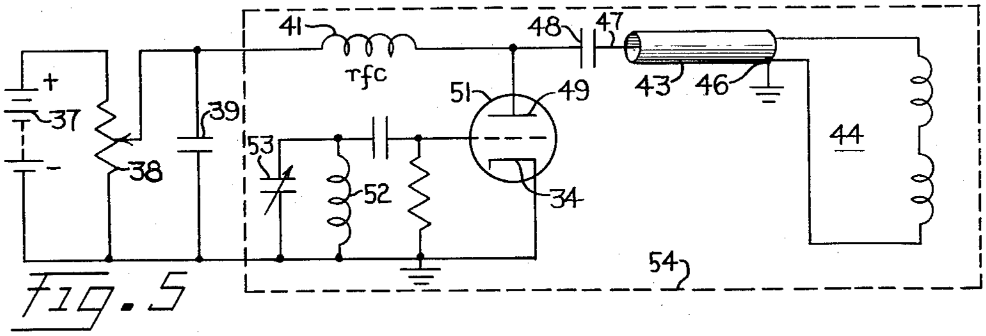

The circuit shown in Fig. 5 can be used to ground one end of the spot wobble yoke. Single conductor shielded cable or coaxial cable 43 can be employed in place of the cable 26 to transmit power to the spot wobble yoke 44 and to serve as the principal capacitance of the oscillatory circuit. The grounded shield or outer conductor 43 is connected at 46 to ground and to the cathode 34, and the central conductor 47 is connected through a large blocking condenser 48, which may have a capacitance of .001 mfd. or more, to the plate 49 of triode 51. The distributed and lumped inductance of the yoke 44 and of the cable 43, together with their capacitances, constitute a resonant shunt circuit connected between anode 49 and cathode 34. This is the principal oscillatory circuit. A local oscillatory circuit consisting of inductance 52 and capacitance 53 is connected between grid and ground, so that this circuit behaves as a tuned grid tuned plate oscillator. Control of oscillation amplitude may be effected by the variable condenser 53 but is preferably accompanied by the voltage divider 38. The dashed line 54 indicates an electrostatic shield which is highly desirable when this invention is applied to television receivers.

While the instant invention has been described with particular reference to television receivers, it will be understood by those skilled in the art that it is equally applicable to television monitors and theatre television projection equipment and indeed to any cathode ray tube circuit wherein the electron beam is scanned over the face of the tube in a series of straight lines.

What is claimed is:

1. A cathode ray tube spot wobble circuit comprising, main deflection means for said cathode ray tube, horizontal and vertical sweep circuits having different frequencies connected to said main deflection means for sweeping the beam of said cathode ray tube across its fluorescent screen at a more rapid rate in one orthogonal direction than in the other, an auxiliary magnetic yoke positioned to deflect said cathode ray tube beam in a direction at right angles to the more rapid sweep of said main deflection means, an oscillator generating an alternating current having a frequency substantially greater than the highest frequency applied to said main deflection means, a cable for applying said alternating current to said auxiliary magnetic yoke, the distributed capacity of said cable taken together with the inductance of said auxiliary magnetic yoke constituting the tank circuit of said oscillator and being resonant to the frequency thereof 2. A cathode ray tube spot wobble circuit comprising, a cathode ray tube, a main deflecting yoke therefor, horizontal and vertical sweep circuits having different frequencies connected to said main deflecting yoke for sweeping the beam of said cathode ray tube across its screen at a more rapid rate in one orthogonal direction than in the other, an auxiliary deflecting yoke mounted on said cathode ray tube to deflect the beam thereof in a direction of right angles to the more rapid sweep of said main deflecting yoke, an oscillator circuit including an election tube, said oscillator circuit generating a signal whose frequency is substantially in excess of the highest sweep frequency applied to said main deflecting yoke, a shielded cable connecitng the anode and grid electrodes of said tube with said auxiliary deflecting yoke, said auxiliary deflecting yoke and the distributed capacity of said cable constituting the tank circuit for said oscillator circuit.

3. A cathode ray tube spot wobble circuit in accordance with claim 2 in which the resonant frequency of said oscillator circuit is between 10 mc./s. and 20 mc./s.

References Cited in the file of this patent

UNITED STATES PATENTS

| | | |
|---|---|---|
| 2,143,933 | Barthelemy | Jan. 17, 1939 |
| 2,299,571 | Dome | Oct. 20, 1942 |
| 2,403,487 | Bedford | July 9, 1946 |
| 2,474,266 | Lyons | June 28, 1949 |
| 2,499,080 | Webb | Feb. 28, 1950 |
| 2,559,525 | Vance | July 3, 1951 |
| 2,619,612 | Lawrence | Nov. 25, 1952 |
| 2,623,196 | Toulon | Dec. 23, 1952 |
| 2,671,129 | Moore | Mar. 2, 1954 |
| 2,677,723 | McCoy et al. | May 4, 1954 |